United States Patent [19]
Ferguson

[11] Patent Number: 6,098,336
[45] Date of Patent: *Aug. 8, 2000

[54] PLANT FLAT-COLLAPSIBLE-CONTAINER

[75] Inventor: Roy G. Ferguson, Mississauga, Canada

[73] Assignee: Chantler Packaging, Inc., Ontario, Canada

[*] Notice: This patent is subject to a terminal disclaimer.

[21] Appl. No.: 09/266,954

[22] Filed: Mar. 12, 1999

Related U.S. Application Data

[63] Continuation-in-part of application No. 09/128,766, Aug. 4, 1998, Pat. No. 5,966,866.

[51] Int. Cl.⁷ ............................. A01G 9/02; A01G 5/00
[52] U.S. Cl. ......................... 47/41.01; 47/65.8; 47/72; 206/423; 383/907
[58] Field of Search ..................... 47/41.01, 65.8, 47/72; 206/423; 383/907

[56] References Cited

U.S. PATENT DOCUMENTS

| D. 2,767 | 8/1867 | Valentine . |
|---|---|---|
| D. 14,896 | 3/1884 | Wilson . |
| D. 200,034 | 1/1965 | Zytko et al. . |
| D. 259,333 | 5/1981 | Charbonneau . |
| D. 300,521 | 4/1989 | Toltzman . |
| D. 369,541 | 5/1996 | Weder et al. . |
| D. 384,002 | 9/1997 | David et al. . |
| 3,556,389 | 1/1971 | Gregoire . |
| 3,734,275 | 5/1973 | Greene . |
| 4,091,925 | 5/1978 | Griffo et al. . |
| 4,333,267 | 6/1982 | Witte . |
| 4,910,913 | 3/1990 | Streeter . |
| 5,228,234 | 7/1993 | De Klerk et al. . |
| 5,235,782 | 8/1993 | Landau . |
| 5,388,695 | 2/1995 | Gilbert . |
| 5,482,752 | 1/1996 | Weder . |
| 5,636,495 | 6/1997 | Weder et al. . |
| 5,640,805 | 6/1997 | Weder . |
| 5,647,168 | 7/1997 | Gilbert . |
| 5,678,355 | 10/1997 | Mori et al. . |
| 5,715,944 | 2/1998 | Windisch . |
| 5,810,169 | 9/1998 | Weder ................................. 206/423 |
| 5,817,382 | 10/1998 | Cheng . |
| 5,924,241 | 7/1999 | Hodge ..................................... 47/72 |
| 5,924,560 | 7/1999 | Swart ............................... 206/45.24 |
| 5,930,982 | 8/1999 | Weder .................................. 53/412 |

FOREIGN PATENT DOCUMENTS

| 394595 | 10/1990 | European Pat. Off. . |
|---|---|---|
| 1432770 | 2/1966 | France . |
| 2056410 | 3/1981 | United Kingdom . |

*Primary Examiner*—Peter M. Poon
*Assistant Examiner*—James S. Bergin
*Attorney, Agent, or Firm*—Robert F. I. Conte, Esq.

[57] ABSTRACT

A plant sleeve or plant bag made from a first panel of thin heat-sealable film and a second panel of thin heat-sealable film. The first panel and second panel are joined together along a first longitudinally-extending seam and a second longitudinally-extending seam. The first longitudinally-extending seam forms a first angle between 55° and 65° with a transverse axis of the container. The second longitudinally-extending seam forms a second angle of between 85° and 90° with the transverse axis. The sleeve or bag can include a protruding portion which extends beyond a transversely-extending edge of the container. The protruding portion can have perforations.

2 Claims, 5 Drawing Sheets

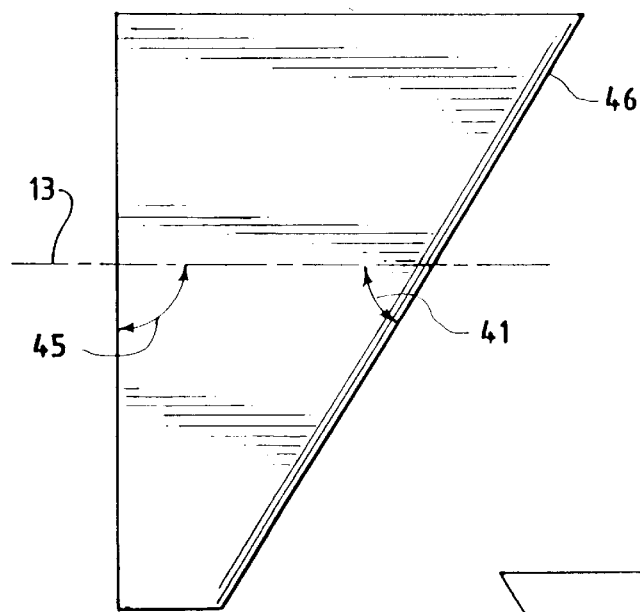
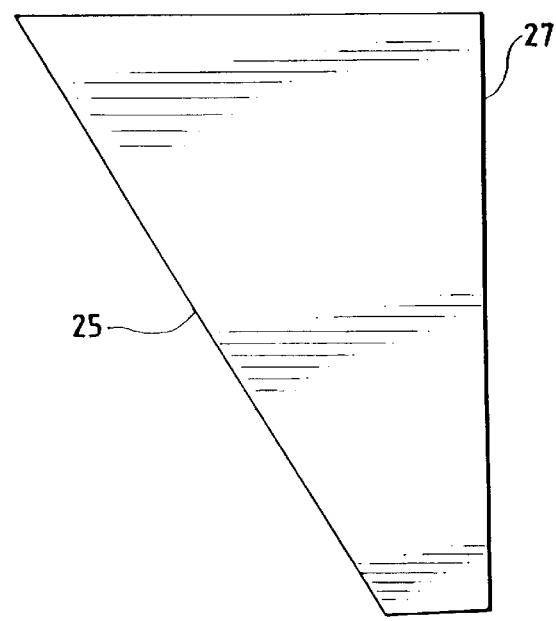
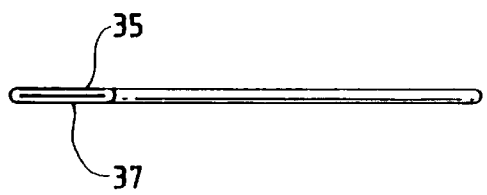

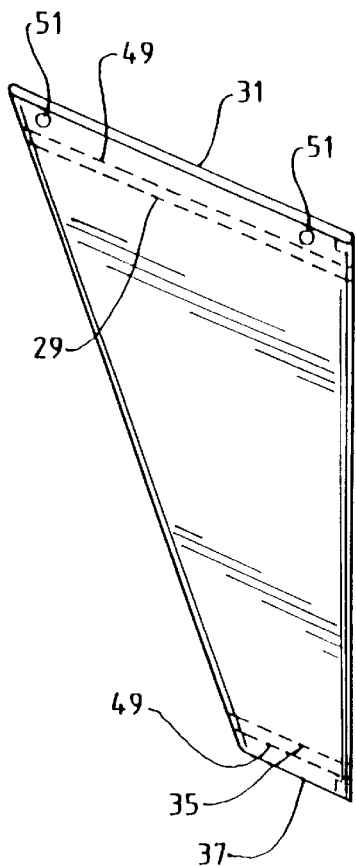
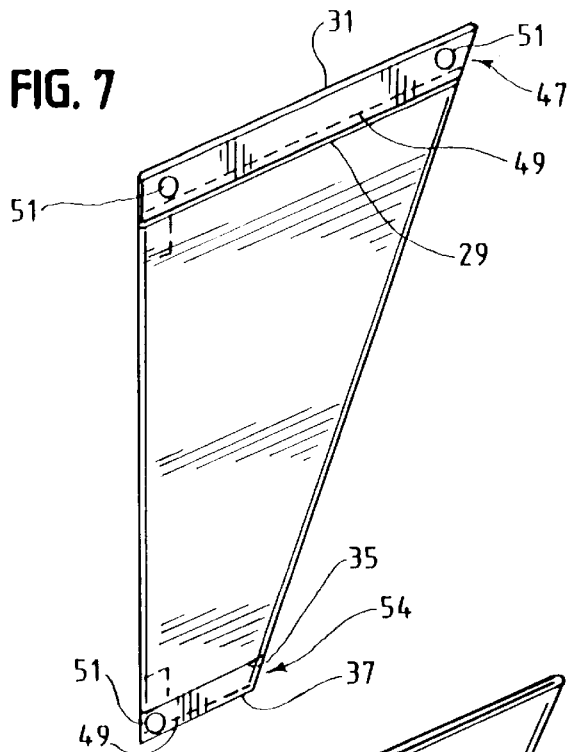
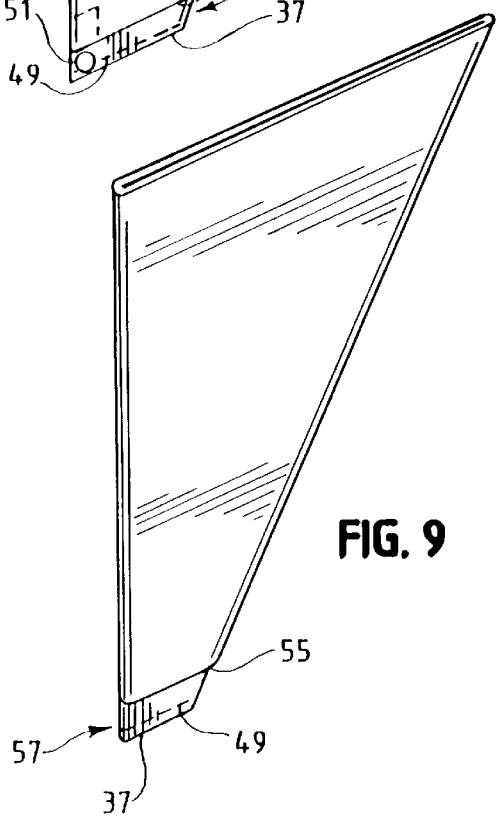

PLANT FLAT-COLLAPSIBLE-CONTAINER

The present application is a continuation-in-part application Ser. No. 09/128,766 filed Aug. 4, 1998 issued as U.S. Pat. No. 5,966,866 on Oct. 19, 1999.

FIELD OF INVENTION

The invention relates to a plant flat-collapsible-container made of thermally sealable film; the container includes a first panel and a second panel joined together along a first longitudinally extending seam and a second longitudinally extending seam.

BACKGROUND

Plant flat-collapsible-containers made of thin thermally sealable film are well-known. These containers, when empty and laid on a horizontal surface, lie flat. The containers generally have a trapezoidal shape. The containers when opened provide a cavity which is used to house plants. The containers when housing plants take on a three-dimensional frustoconical shape. As used herein, the term "plants" or "plants" is used in its broadest sense and includes anything falling within the plant kingdom, including flowers, cut flowers and potted plants.

U.S. Pat. No. 5,388,695, Gilbert, discloses an example of a plant flat-collapsible-container. The container is made of two thin film panels. The panels are heat sealed together, one on top of the other, along the container's equally angulated sides. The container, when empty, lies flat and has a trapezoidal shape. The panels are also heat sealed along the bottom end of the container. The top edges of each panel are freely separable to form the mouth of the container. The container thus forms a flower bag.

U.S. Pat. No. 5,228,234, de Klerk, shows another plant flat-collapsible-container. The container is also made from two thin film panels. The sides of each panel are also heat sealed along the container's equally angulated sides. The bottom edges of each panel are not necessarily sealed. Thus cut-flower stems can exit from the bottom of the container. A container with an unsealed bottom is known as a flower sleeve.

In de Klerk, one of the container panels has a top edge which protrudes beyond the top edge of the other container panel. The protruding part of the one container panel is perforated to create a tear line. When the containers are packed for dispensing, they are clamped together along the protruding part of the one container panel. The containers are then dispensed by tearing them from the plurality of containers, one by one, along the tear line.

U.S. Pat. No. 4,333,267, Witte, also describes a plant flat-collapsible container. The container also has a trapezoidal shape. The container is also made of two thin film panels which are also heat sealed one on top of the other. The panels are heat sealed only along the container's equally angulated sides. One of the container panels has a protruding top edge which can be folded over and adhesively sealed to the other container panel. Thus a user, after filling the container, can close the container by folding the protruding top edge of the one panel over the other panel.

Gilbert further discloses an example of how to make plant flat-collapsible-containers. The containers are made by intermittently advancing, in timed sequence, two webs. The webs are disposed one on top of the other. The webs are formed into containers in a single heat sealing station or multiple stations. In the heat sealing station a hot wire is applied to the two webs to form the side seams and bottom seams of the container. The two webs can be obtained from separate sheets of material or from a single sheet of double-folded material. The containers may be stamped or marked with promotional advertising during manufacture. The patent discloses the following machines as acceptable to perform the method: the Guard 200HS, available from Guard & Associates, Denver Colo.; and the Lemo 850K or 850KS, available from Lemo H. Lehmacher & Son, GmbH, Neiderkassel-Mondorf, Germany.

Known plant flat-collapsible-containers made of thin heat sealable film, once filled, are clumsy and difficult to pick up. The containers do not have a convenient gripping area. Additionally, the promotional material added to the container during manufacture, while useful to a retailer, has no use to a consumer. In fact, many consumers would consider the promotional material to detract from the aesthetic appearance of the container. Also, the promotional material is sometimes difficult to see when the filled containers are displayed, because the filled containers are often arranged in close proximity to one another.

Disposing a conventional handle on the container would aid in the handling. However, the handle would detract from the aesthetic appearance of the sleeve and would complicate manufacturing. Disposing fliers, brochures or posts in the plant would help to facilitate the display of the promotional material by the retailer and permit removal of the promotional material by the consumer. The use of these types of promotional materials, however, has drawbacks. The promotional materials require time-consuming efforts to place on the plants and flowers. Additionally, the promotional materials may fall off the plants during packing and unpacking.

SUMMARY

The present invention desires to make it easier to pick up filled plant flat-collapsible-containers made of thin heat sealable resinous film. The invention makes it easier to pick up filled containers by providing a pickup point. The container provides the pickup point by having a longitudinally extending side at about a 90° angle with a transverse axis of the container, and another longitudinally extending side at about an angle of 60° with the transverse axis. Providing one side with an angle of 90° and the other side with an angle of 60° causes the container, when filled, to take on a shape different from previous containers.

The pickup point also provides advantages for displaying promotional material. The pickup area provides a convenient way to elevate the promotional material to facilitate display. Also, the pickup area can be bordered by a tear line. Thus, the promotional material can be removed by the user to eliminate its non-aesthetic appearance, and the pickup area could include coupons for cross-merchandising.

The invention also desires to improve the method of making plant flat-collapsible-containers made of thin heat-sealable film. The invention improves the method of making by improving the tension control over the webs as they are fed through the container-making apparatus. The invention improves tension control by drawing the webs through an additional pair of draw rolls. The draw rolls are upstream of the 60°-angulated seal bar and the 90°-angulated seal bar.

Accordingly, the plant flat-collapsible-container which is the subject of the present invention has a first panel made of a thin, heat-sealable film and a second panel made of a thin, heat-sealable film. The first and second panels are disposed one on top of the other. The first and second panels are joined together along a first longitudinal seam and a second longitudinal seam to form longitudinally-extending sides of the container.

The first and second panels have first and second panel transversely-extending long edges. The first panel transversely-extending long edge is freely separable from the second panel to form a large opening into an interior of the container. The container has a transversely-extending short side opposite the transversely-extending long edges.

The first longitudinally-extending seam forms a first angle between 55° and 65° with a transverse axis of the container. The second longitudinally-extending seam forms a second angle between 85° and 90° with the transverse axis of the container. The first angle can be 60° and the second angle can be 90°.

The flat-collapsible-container can have a protruding strip formed from a group of structures consisting of: a second panel transversely-extending long edge protruding beyond the first panel transversely-extending long edge, a second panel transversely-extending short edge protruding beyond a first panel transversely-extending short edge, and the second panel transversely-extending short edge protruding beyond a transversely-extending short seam. The transversely-extending short seam is opposite the first panel transversely-extending long edge and extends into the first and second longitudinally-extending seams.

The container can further include tear lines made of vertical and horizontal perforations. The perforations allow a user to further open up the container to facilitate removal of a plant from the container. The flat-collapsible-container can also include a tear line made of perforations extending along the protruding strip.

The method of making the plant flat-collapsible-container includes aligning two webs one on top of the other. The aligned webs are heat sealed together at a first angle of between 55° and 65° respective to a longitudinal axis of the two aligned webs. The aligned webs are also heat sealed together at a second angle of between 85° and 90° respective to the longitudinal axis of the aligned two webs. The heat sealing to form the second angle occurs at a place downstream of the heat sealing done at the angle of between 55° and 65°. A first longitudinal seam of the container is formed from heat sealing the aligned webs together at the angle of between 55° and 65°. A second longitudinal seam of the container is formed from heat sealing the aligned webs together at the angle of between 85° and 90°.

The step of heat sealing the aligned webs together at a second angle can use an angle of 90°.

The method of making the plant flat-collapsible-container can include the further steps of: (1) moving the aligned webs between a pair of first drawrolls which are upstream of where the aligned webs are heat sealed together at the first angle of between 55° and 65°, and (2) moving the aligned pair of webs through a second pair of drawrolls at a place upstream from where the webs are heat sealed at the angle of between 85° and 95° and downstream of where the aligned webs are heat sealed at the angle of between 55° and 65°.

BRIEF DESCRIPTION OF THE DRAWINGS

FIG. 4 is a front view of the empty container looking towards the first panel.

FIG. 5 is a back view of the empty container looking into the second panel.

FIG. 6 is a bottom view of the empty container.

FIG. 7 discloses an alternative embodiment of the empty container, shown from the same view as FIG. 2, in which a second panel transversely-extending long edge of the container extends beyond the container's first panel transversely-extending long edge, and a second panel transversely-extending short edge of the container extends beyond the container's first panel transversely-extending short edge.

FIG. 8 shows the alternative embodiment from the same view as FIG. 3.

FIG. 9 shows another alternative embodiment of the empty container from the same view as FIG. 2, in which the container has a short transversely-extending longitudinal seam forming a sealed bottom of the container.

DETAILED DESCRIPTION

Figure 1:
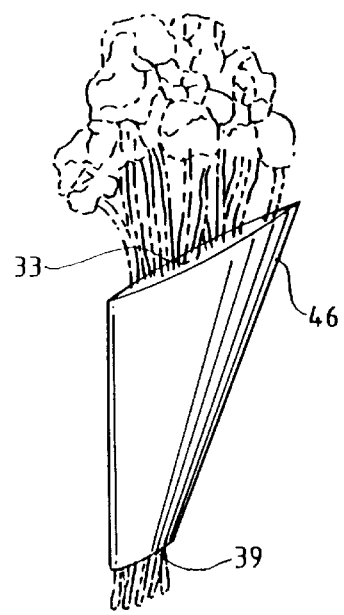
FIG. 1 is a top perspective view showing a filled plant flat-collapsible-container, which is the subject of the present invention.
Figure 2:
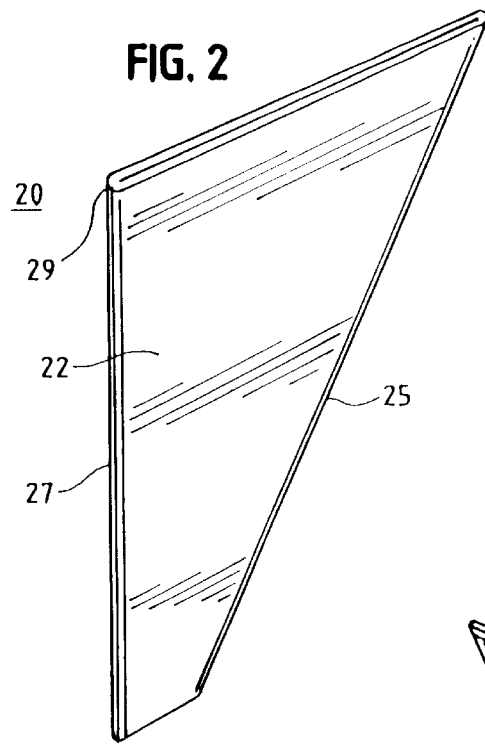
FIG. 2 is a top front perspective view of the empty plant flat-collapsible-container; the view looks towards the container into the first panel.
Figure 3:
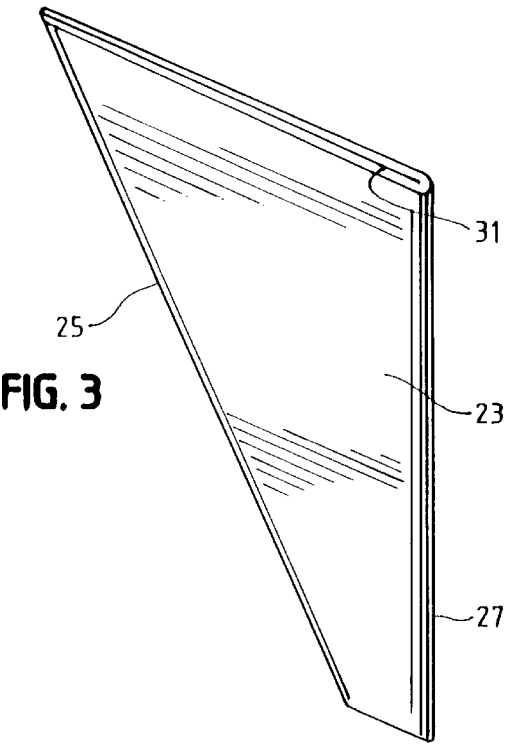
FIG. 3 is a top back perspective view of the empty plant flat-collapsible container looking into the second panel.

Referring to FIGS. 1–6, the shown plant flat-collapsible-container is a flower sleeve. The flower sleeve 20 has a first panel 22 on top of a second panel 23. The first and second panels are only joined together along a first longitudinal seam 25 and a second longitudinal seam 27. The sleeve has a first panel transversely-extending long edge 29 and a second panel transversely-extending long edge 31. The first and second long edges are freely separable from each other and open up to form a large opening 33 into the interior of the sleeve. The sleeve also has a first panel transversely-extending short edge 35 and a second panel transversely-extending short edge 37. The first and second transversely-extending short edges are freely separable from each other and open up to form an opening 39 smaller than the large opening; cut-flower stems can exit the sleeve from the small opening 39.

A user packs flowers into the sleeve by opening the sleeve at its large opening 33. Cut flowers or other plants are placed inside the sleeve. The flowers generally project above the transversely-extending long edges. The flower stems project through the small opening 39.

The sleeve's first longitudinally-extending seam 25 forms a first angle 41 of 60° (preferred) with a transverse axis 43 of the sleeve. The second longitudinally-extending seam forms a second angle 45 of about 90° (preferred) with the transverse axis 43 of the sleeve. The first angle 41 can be between 55° and 65°. The second angle 45 can be between 85° and 90°.

The angles of the longitudinally-extending seams cause the sleeve when filled to form a pickup point 46. The pickup point forms because a portion of the sleeve, at the intersection of the sleeve's first panel long edge 29 and its 60°-angulated seam 25, projects further upwards than a portion of the sleeve at the intersection of the sleeve's first panel long edge 29 and 90°-angulated seam 27. The pickup point makes it easier for a user to handle the filled container during packing.

FIGS. 7 and 8 show an alternative embodiment in which the second panel transversely-extending long edge 31 is longitudinally spaced from the first panel transversely-extending long edge 29 so that the second panel transversely-extending long edge 31 protrudes beyond the first panel transversely-extending long edge 29. Having the second edge protruding beyond the first edge allows for a protruding portion 47 of the second panel 23 to be folded over the first panel 22 to provide a cover. The protruding portion of the second panel can have an adhesive strip (not shown).

The protruding portion 47 can also function as a tear strip. To form a tear strip, a series of perforations 49 are disposed on the protruding portion 47 of the second panel 23. The perforations form a tear line.

A plurality of sleeves can be bonded together along the protruding portion 47. The protruding portion 47 can include one or more large openings 51 through which a rod can extend. The plurality of bonded sleeves can then be hung on the rod. A user can separate a single sleeve from the bonded plurality of sleeves by tearing each sleeve off from the plurality one by one along the tear line formed by perforations 49.

Still referring to FIGS. 7 and 8, the sleeve can also include a protruding portion 54 at the sleeve's small transverse side in addition to or in place of the protruding portion 47 at the sleeve's large transverse side. To form the protruding portion 54 at the small transverse side, the second panel transversely-extending short edge 37 is longitudinally spaced from the first panel transversely-extending short edge 35 so that the second panel short edge 37 extends beyond the first panel short edge 35 to form the second panel protruding portion 54. The protruding portion of the second panel can be utilized as a tear strip by applying perforations 49. Additionally, the tear strip at the short transverse side could also have holes 51 to allow a plurality of bonded sheets to be hung on a rod or rods.

The flower sleeve can have perforations (not shown) to allow for the circulation of air within the interior of the flower sleeve.

As a further alternative, as shown in FIG. 9, the flat-collapsible-container, rather than being a flower sleeve, can be a flower bag. The flower bag is similar to the flower sleeve described in FIGS. 1–6. The flat-collapsible-container shown in FIG. 9 includes a transversely-extending short seam 55 along the container's transversely-extending short side. The transversely-extending short seam seals the bottom of the container closed. Thus, the bag does not have a first panel short edge 35 and a second panel short edge 37 which open to provide an exit for flower stems.

The bag shown in FIG. 9 could have a protruding portion at its large open end. The bag shown in FIG. 9 does have a protruding portion 57 at its transversely-extending short side. The protruding portion is formed by again having the second panel transversely-extending short edge 37 protrude beyond the transversely-extending short seam 55. The protruding portion 57 includes perforations 49 forming a tear strip.

Figure 10:
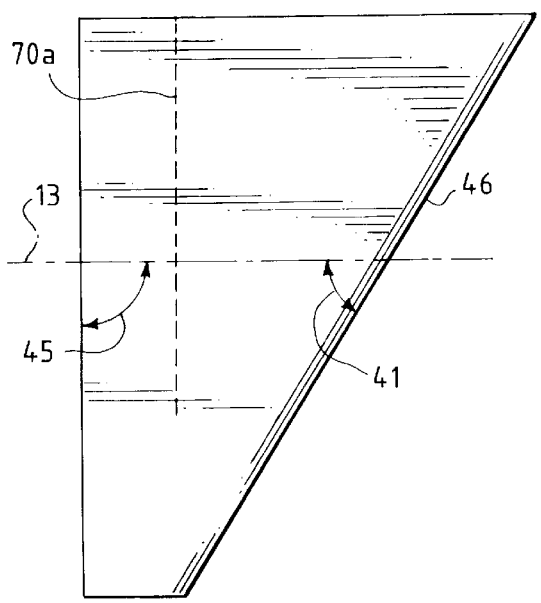
FIGS. 10 and 10a show a further alternative embodiment taken from the same views as shown in FIGS. 4 and 5, respectively.
Figure 10A:
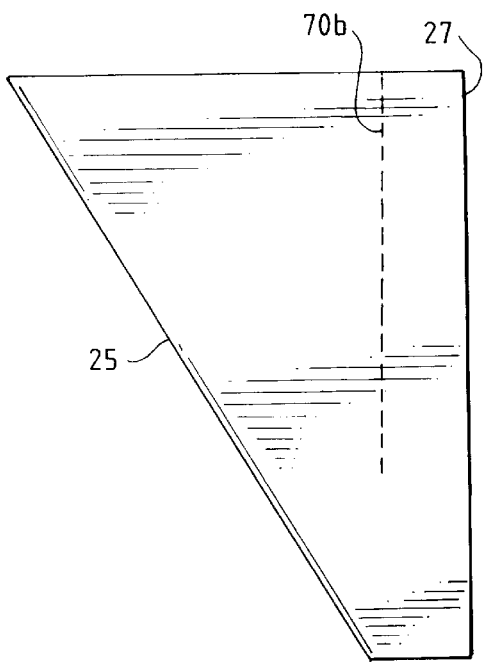

As another alternative, a shown in FIGS. 10 and 10a, the plant flat-collapsible-container can include a series of vertical perforations 70a, 70b. The vertical perforations 70a, 70b allow a user to tear the container, along the container's longitudinal length, from the container's mouth towards its transversely extending short side. The tearing further opens the container, which facilitates removal of the plant.

Figure 11:
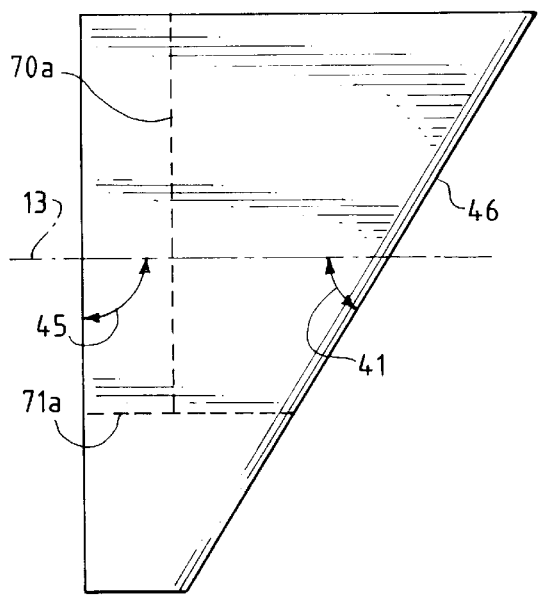
FIGS. 11 and 11a show still a further alternative embodiment of the empty container taken from the same views as shown in FIGS. 4 and 5, respectively.
Figure 11A:
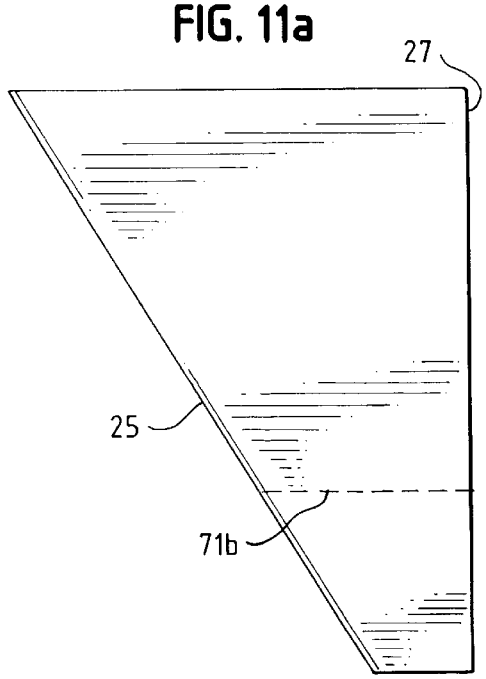

As still a further alternative, as show in FIGS. 11 and 11a, the sleeve can have transversely extending perforations 71a, 71b. The transverse portion 71a interconnects with a single longitudinal perforation 70a. The transverse perforations 71a, 71b allow a user to separate an upper portion of the bag from a lower portion of the bag. Separation facilitates plant removal. Other arrangements of perforations could be used to open the container to facilitate plant removal.

Figure 12:
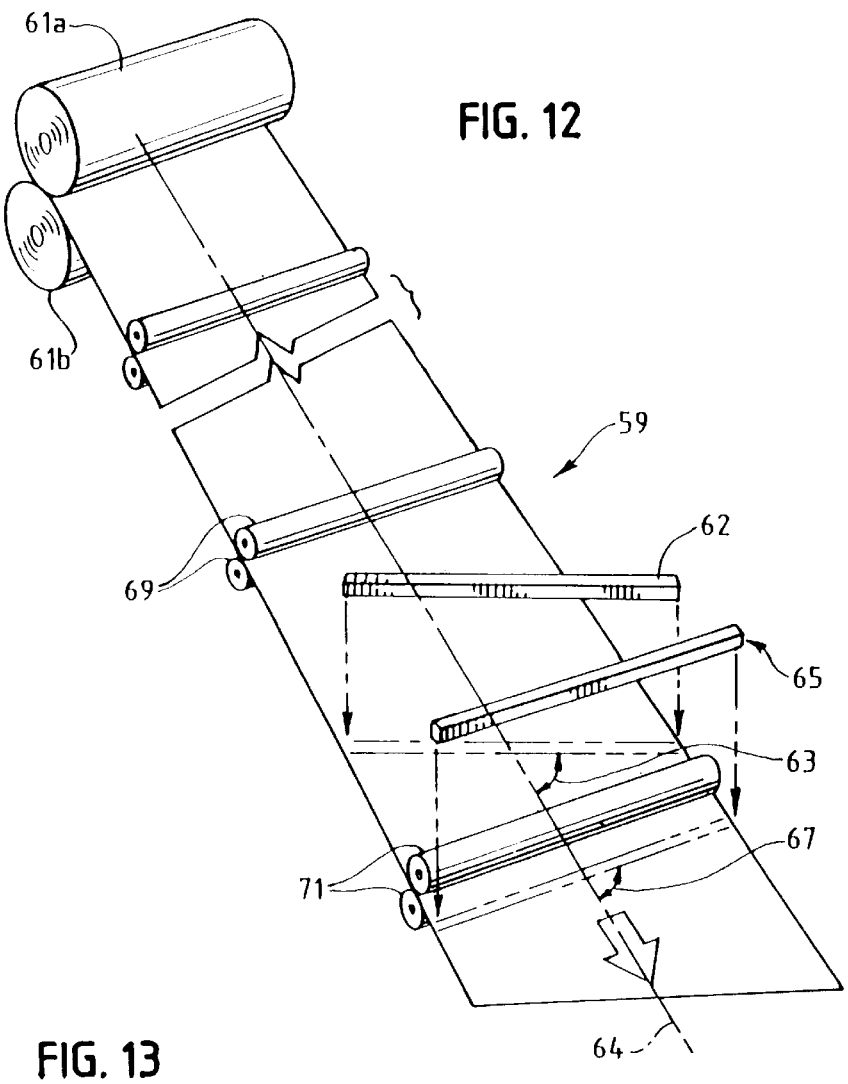
FIG. 12 shows a perspective view of a flower-sleeve-making apparatus in the process of making the flower sleeve disclosed in FIG. 2.
Figure 13:
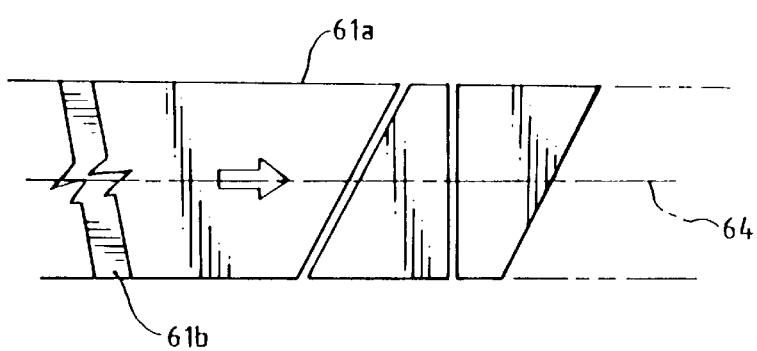
FIG. 13 shows a top view of the webs shown in FIG. 10 with the longitudinal seams cut in the webs.

FIGS. 12 and 13 schematically disclose how a flower-sleeve-making apparatus utilizes two webs to produce flower sleeves. The flower-sleeve-making apparatus 59 has uploaded onto it two webs 61a, 61b. The two webs are between a first pair of drawrolls 69 and are aligned one on top of the other. The manner in which the webs are fed into the first pair of drawrolls 69 can vary and is not shown. A first seal bar 62 is downstream of the first pair of drawrolls. The two webs 61a, 61b are disposed underneath the first seal bar 62. The first seal bar 62 is at a first angle 63 of 60° to a longitudinal axis 64 of the aligned webs. The aligned webs are also disposed underneath a second seal bar 65. The second seal bar is downstream of the first seal bar. The second seal bar is at a second angle 67 of 90° to the longitudinal axis of the web. The aligned webs are further disposed between a second pair of drawrolls 71. The second pair of drawrolls is downstream of first seal bar 62 and upstream of the second seal bar 65. The first and second pair of drawrolls help to control tension on the web.

The uploaded and aligned webs are moved intermittently in timed sequence over a flower sleeve apparatus support surface (not shown). As the aligned webs are intermittently moved downstream, the first and second seal bars, simultaneously and intermittently in timed sequence with the intermittent movement of the webs, seal the aligned webs together to form the first and second longitudinally-extending seams of a flower sleeve. Each application of the first and second bars to the aligned webs produces the longitudinal seams of sleeves which are adjacent and oppositely aligned.

As can be seen in FIG. 13, the application of the first and second seal bars to the aligned webs both cuts and seals the webs. To help ensure that adjacent portions of cut webs remain connected to each other for further processing, the seal bars can apply a piece of adhesive tape to the web as it cuts and seals the web. The adhesive tape tags the adjacent portions of cut web together to ensure the adjacent portions do not become misaligned as they are further processed.

Although the schematic shows each web coming from a separate roll, each of the two webs can come from a single roll of double-folded film. After formation, the sleeves are typically stacked one on top of the other. The plurality of stacked sleeves can then be hot-needled together to form a stack of hot-needled sleeves.

What is claimed is:

1. A plant flat-collapsible-container comprising:
   a first panel made of thin, heat-sealable film;
   a second panel made of thin, heat-sealable film, said second panel adjacent to said first panel;
   a first longitudinally-extending seam and a second longitudinally-extending seam, said first and second panels joined together along said first and second longitudinally-extending seams, said first and second longitudinally-extending seams forming longitudinally-extending sides of the container;

a first panel transversely-extending long edge forming an edge of said first panel;

said first panel transversely-extending long edge freely separable from said second panel to form a large opening into an interior of the container;

a short transversely-extending side defined by said container, said short transversely-extending side opposite said first panel transversely-extending long edge, a first portion of said container is separable from a second portion of said container along a longitudinally extending tear line, and wherein a separation is formed between said first and second container portions when said first and second portions are separated along said tear line, and wherein said separation facilitates removal of a plant from said container, and wherein said first longitudinally-extending seam forms a first angle between 55° and 65° with a transverse axis of the container; and said second longitudinally-extending seam forms a second angle with the transverse axis of the container, said second angle being between 85° and 90°, and wherein said first and second angles are interior angles on the same side of the transverse axis.

2. The flat-collapsible-container of claim 1 further comprising:

a transversely extending tear line intersecting said longitudinally extending tear line.

* * * * *